(12) United States Patent
Harris et al.

(10) Patent No.: US 8,617,492 B2
(45) Date of Patent: Dec. 31, 2013

(54) SYSTEM AND METHOD FOR MAKING LOW VOLATILE CARBONEACEOUS MATTER WITH SUPERCRITICAL CO2

(75) Inventors: Randall J. Harris, Mount Gay, WV (US); Damian Wales, Powellton, WV (US)

(73) Assignee: Carbonxt Group Limited, Earlwood, New South Wales (AU)

( * ) Notice: Subject to any disclaimer, the term of this patent is extended or adjusted under 35 U.S.C. 154(b) by 782 days.

(21) Appl. No.: 12/008,287

(22) Filed: Jan. 8, 2008

(65) Prior Publication Data

US 2009/0175780 A1    Jul. 9, 2009

(51) Int. Cl.
    *B01J 8/00*    (2006.01)

(52) U.S. Cl.
    USPC ........... 422/608; 422/618; 422/187; 423/460; 423/461

(58) Field of Classification Search
    USPC ......... 422/129, 187–189, 198, 242, 234, 235, 422/608, 618, 630; 134/26
    See application file for complete search history.

(56) References Cited

U.S. PATENT DOCUMENTS

| | | | |
|---|---|---|---|
| 1,565,129 A | 12/1925 | Wallace | |
| 1,819,166 A | 8/1931 | Hass | |
| 1,867,750 A | 7/1932 | Naugle | |
| 3,961,020 A | 6/1976 | Seki | |
| 4,014,817 A | 3/1977 | Johnson et al. | |
| 4,083,940 A | 4/1978 | Das | |
| 4,157,314 A | 6/1979 | Murty | |
| 4,397,248 A | 8/1983 | Mehta et al. | |
| 4,780,112 A | 10/1988 | Lloyd et al. | |
| 4,810,258 A | 3/1989 | Greene | |
| 5,017,281 A | 5/1991 | Sadeghi et al. | |
| 5,179,058 A | 1/1993 | Knoblauch et al. | |
| 5,281,406 A | 1/1994 | Stalling et al. | |
| 5,314,124 A | 5/1994 | Kindig | |
| 5,437,845 A | 8/1995 | Brioni et al. | |
| 5,888,469 A | 3/1999 | Stiller et al. | |
| 6,033,506 A | 3/2000 | Klett | |
| 6,077,464 A | 6/2000 | Murdie et al. | |
| 6,160,193 A | 12/2000 | Gore | |
| 6,339,031 B1 | 1/2002 | Tan | |
| 6,544,491 B1 | 4/2003 | Stiller et al. | |

(Continued)

FOREIGN PATENT DOCUMENTS

| | | |
|---|---|---|
| DE | 3743248 C1 | 9/1989 |
| WO | WO 2005/035128 A2 | 4/2005 |
| WO | WO-2009089356 A1 | 7/2009 |

OTHER PUBLICATIONS

PCT Notification of Transmittal of the International Search Report and the Written Opinion of the International Searching Authority, or the Declaration (Aug. 1, 2009); (PCT/US2009/030448).

(Continued)

*Primary Examiner* — Timothy Cleveland
(74) *Attorney, Agent, or Firm* — Patton Boggs LLP

(57) ABSTRACT

A system for making low volatile carbonaceous material including a digestion vessel in communication with a carbonaceous material feedstock unit for producing a digested carbonaceous material; an extraction vessel in communication with the digestion vessel, the extraction vessel containing supercritical carbon dioxide fluid for extracting hydrocarbons from the digested carbonaceous material to produce an extract solvent and the low volatile carbonaceous material; and at least one separation vessel in communication with the extraction vessel for separating the extract solvent to a carbon dioxide gas and a stream of extracted hydrocarbons.

18 Claims, 8 Drawing Sheets

(56) References Cited

U.S. PATENT DOCUMENTS

| | | |
|---|---|---|
| 6,733,737 B1 | 5/2004 | Tan et al. |
| 6,797,251 B1 | 9/2004 | Bennett et al. |
| 6,899,970 B1 | 5/2005 | Rogers et al. |
| 6,979,513 B2 | 12/2005 | Kelley et al. |
| 7,255,233 B2 | 8/2007 | Daniels et al. |
| 7,648,691 B2 | 1/2010 | Nagata |
| 2001/0002387 A1 | 5/2001 | Tsutsumi et al. |
| 2003/0064216 A1 | 4/2003 | Tobita et al. |
| 2003/0181315 A1 | 9/2003 | Suzuki et al. |
| 2004/0065353 A1 | 4/2004 | Tunnicliffe et al. |
| 2004/0140261 A1 | 7/2004 | Taylor et al. |
| 2006/0150474 A1 | 7/2006 | Lloyd |
| 2007/0277430 A1 | 12/2007 | Jackman et al. |
| 2009/0172998 A1 | 7/2009 | Harris et al. |

OTHER PUBLICATIONS

PCT Notification of Transmittal of the International Search Report and the Written Opinion of the International Searching Authority, or the Declaration (Aug. 1, 2009); (PCT/US09/30447).

PCT Notification of Transmittal of the International Search Report and the Written Opinion of the International Searching Authority, or the Declaration (Aug. 1, 2009); (PCT/US09/030442).

In the US Patent and Trademark Office U.S. Appl. No. 12/008,268 Final Office Action dated May 7, 2012, 10 pages.

In the US Patent and Trademark Office U.S. Appl. No. 12/008,268 Non-Final Office Action dated Oct. 5, 2011, 11 pages.

In the US Patent and Trademark Office U.S. Appl. No. 12/008,269 Final Office Action dated Jun. 19, 2012, 25 pages.

In the US Patent and Trademark Office U.S. Appl. No. 12/008,269 Non-Final Office Action dated Oct. 11, 2011, 19 pages.

In the US Patent and Trademark Office U.S. Appl. No. 12/246,007 Non-Final Office Action dated Oct. 23, 2012, 22 pages.

In the US Patent and Trademark Office U.S. Appl. No. 12/246,007 Restriction Office Action dated Feb. 1, 2012, 4 pages.

In the US Patent and Trademark Office U.S. Appl. No. 12/967,874 Final Office Action dated Oct. 17, 2012, 3 pages.

In the US Patent and Trademark Office U.S. Appl. No. 12/967,874 Non-Final Office Action dated Apr. 11, 2012, 3 pages.

In the US Patent and Trademark Office U.S. Appl. No. 12/967,874 Restriction Office Action dated Dec. 27, 2011, 5 pages.

PCT Notification of Transmittal of the International Search Report and the Written Opinion of the International Searching Authority, or the Declaration (Jan. 2, 2010); (PCT/US2009/058150).

SYSTEM AND METHOD FOR MAKING LOW VOLATILE CARBONEACEOUS MATTER WITH SUPERCRITICAL CO2

FIELD OF THE INVENTION

The field of the invention is directed to devolatilizing carbonaceous material and more specifically to devolatilizing carbonaceous material while recovering volatile compounds from the carbonaceous matter.

BACKGROUND OF THE INVENTION

Carbonaceous matter typically contains volatile compounds that make the carbonaceous material less desirable or useful than it otherwise would be for some purposes. Volatile compounds are those compounds that are given off as a vapor or gas by heating the carbonaceous material to a particular temperature. For example, volatile compounds or matter are given off by heating coal up to 950° C. under carefully controlled conditions and driving off the volatile compounds; the mass of which is determined by measuring the weight loss of the coal after the heating process. It typically does not include the weight loss due to water content, which is removed at 105° C.

Volatility is usually critical to industries that commonly use carbonaceous materials in their processes, for example coal for furnaces for steel making, coke manufacturing, and also for power generation. It is commonly known that volatility determines the burn rate of a particular coal. High volatility coal ignites easily, but it is not as desirable as moderately to low volatility coals because it does not contain as much energy per unit volume due to its high volatility. Many coals are "coked" prior to their industrial use by removing the volatile compounds through heating it to high temperatures in the absence of oxygen. Coking coal is used in the steel manufacturing process, where carbon must be as volatile-free and ash-free as possible. Calcining is another thermal treatment process that removes the volatile fraction of the carbonaceous material, such as coal. Typically, coking processes occur at temperatures of approximately 500° C. and calcining processes occur at temperatures of approximately 1,300° C. Both of these processes typically occur in inert atmospheres in the absence of oxygen. The problem with these types of processes is that they require high energy requirements and do not typically recover the volatile compounds as they are vented to the atmosphere or a gas scrubber of some type.

It has become increasingly important to recover the volatile compounds that are entrained in the carbonaceous material, such as coal For example, coal tar is a liquid having a high viscosity that has many uses including: fuel, pharmaceutical bases, shampoos, soaps, carbon fibers, waterproofing materials, and as a raw material for dyes, drugs, and paints. Coal tar may be extracted from coal by a variety of processes. For example, it is known to use solvent extraction processes to remove the volatile coal tar from coal.

In addition to calcining and coking coal, there exist several solvent extraction methods for removing the volatile compounds from carbonaceous material, such as coal. Typically, organic solvents, such as chlorinated organic solvents, are used to extract the volatile compounds from coal and then recovered during a distillation process. Many of these type solvents are hazardous materials and require substantial expenses related to implementing safety devices and measures for handling, storing, and using such solvents. In addition, efficient distillation of the volatile compounds from the organic solvents may not always be achievable.

U.S. Pat. Nos. 4,871,443 and 4,806,228 discloses a method for removing salts from coal tar and coal pitches. The method includes washing the coal tar/pitch in a pressure container with water and carbon dioxide gas at a temperature and pressure near the critical point of the gas. Recovery and removal of the solvent and the tar or pitch phase occurs upon reduction of the pressure. The methods are performed on an already extracted coal tar/pitch specimen and not on untreated carbonaceous material, such as coal.

U.S. Pub. Pat. App. No. 20070095753 discloses methods for removing residues from substrates using environmentally friendly solvents. Petroleum residue, including coal tar is removed from a petroleum-based substrate by dissolution in carbon dioxide miscible solvent, which dissolves a portion of the petroleum residue. The solvent is then separated and contacted with carbon dioxide such that the petroleum residue is precipitated. This reference discloses the use of environmentally friendly solvents, known as GRAS solvents.

U.S. Pat. No. 4,446,921 discloses a method for the underground gasification of solid fuels in which volatile compounds existing in the solid fuel can be recovered. Underground solid fuel is opened up with a super critical gas phase that dissolves water and the volatile organic compounds that would otherwise impede the later gasification process. The volatile organic compounds and water are later separated from the super critical gas phase above ground. It discloses that the gas enters the underground solid fuel at a temperature 10° C. to 100° C. above its supercritical temperature and at a pressure 2 bar to 300 bar above its critical pressure. This is performed on untreated solid fuel deposits, such as underground coal deposits.

SUMMARY

In one embodiment, the present system and method for malting low volatile carbonaceous matter with supercritical $CO_2$ ("system for making low volatile carbonaceous matter") includes removing coal tar from coal with supercritical $CO_2$. Typically, the coal is washed and sized at preparation plants located near coal mines. Then, the coal may be further treated by processes that remove inorganic impurities and/or contaminants, such as metal oxides, and the like. After the coal has been treated to remove these contaminants, then it is subjected to the present system for making low volatile carbonaceous matter that contacts the treated coal with supercritical $CO_2$ that extracts volatile compounds from the treated coal that are recovered in a subsequent separation process.

The present system for making low volatile carbonaceous matter provides a clean devolatilized coal and a supply of valuable volatile compounds for later use as a base or intermediate raw material in other manufacturing processes. Coal tar, one of the extracts from the present system for making low volatile carbonaceous matter, may be distilled to carbon pitch, which is a primary component for making carbon fibers and related carbon fiber composite materials. In another embodiment, the present system for making low volatile carbonaceous matter produces a clean high quality activated carbon product.

In one embodiment, the present system for making low volatile carbonaceous material includes a digestion vessel in communication with a carbonaceous material feedstock unit for producing a digested carbonaceous material; an extraction vessel in communication with the digestion vessel, the extraction vessel containing supercritical carbon dioxide fluid for extracting hydrocarbons from the digested carbonaceous material to produce an extract solvent and the low volatile carbonaceous material; and at least one separation vessel in communication with the extraction vessel for separating the extract solvent to a carbon dioxide gas and a stream of extracted hydrocarbons.

DETAILED DESCRIPTION OF THE DRAWINGS

Figure 1:
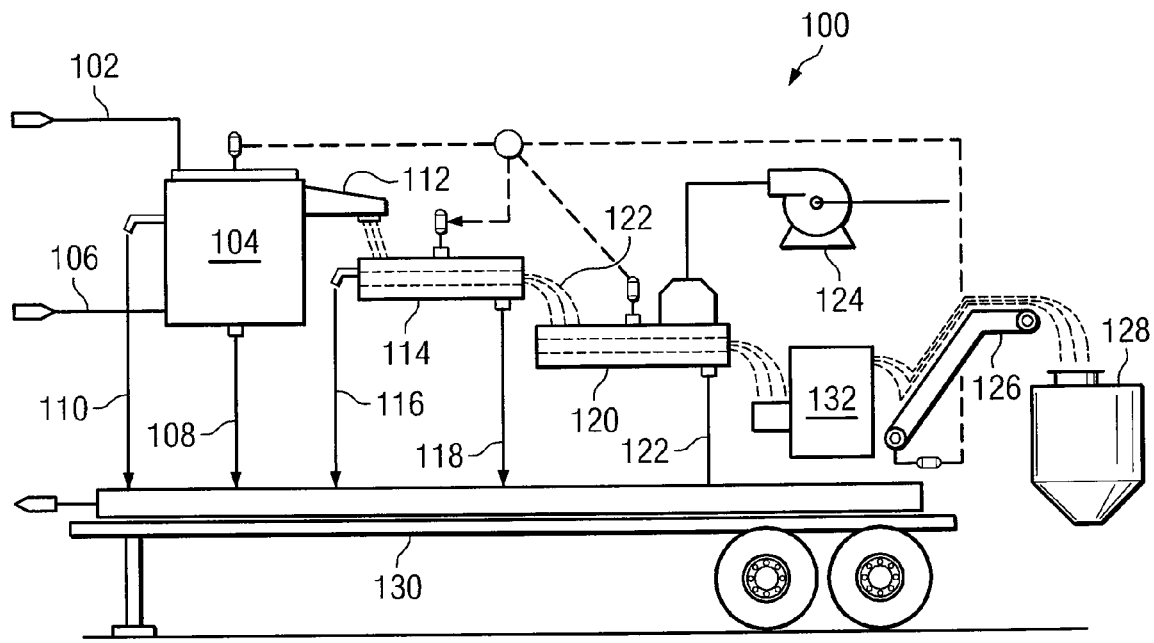
FIG. 1 illustrates a schematic diagram of a carbonaceous material feedstock unit according to an embodiment of the present invention.

In the drawings, like or similar elements are designated with identical reference numerals throughout the several views and figures thereof, and various depicted elements may not be drawn necessarily to scale.

The term "carbonaceous" means all materials that consist of substantial amounts of carbon. Without limitation the term includes coal, refined coal, activated carbon, carbon black carbon products, solid crude oil, coal tar pitch, carbon fibers, tar, carbon, coke, graphite, and other carbon structures.

The term "digested carbonaceous material" means a carbonaceous material that has been subject to a cleaning or digesting process as herein described. In one aspect, the term means chemically cleaning the carbonaceous material by digesting the minerals embedded within the carbonaceous material. This term may further mean a carbonaceous material that has been chemically cleaned and may be noted as "chemically cleaned carbonaceous material."

The term "macropore" typically means pores having a diameter size of greater than 50 nm The term "micropore" typically means pores having a diameter size of smaller than 50 nm. The term "product" means all materials that are made from refined carbonaceous material, including without limitation: plastics, fibers, solvents, pharmaceuticals, carbon black inks, activated carbon, carbon, tar, specialty minerals, boiler fuels, additives, gas cleanup, and the like.

FIG. 1 illustrates an embodiment 100 of a carbonaceous material feedstock unit according to the present invention. In one embodiment, the carbonaceous material feedstock production unit 100 may be portable for relocating it at any location that produces a waste stream and/or settling pond stream containing carbonaceous material such as preparation plants or washeries as is known to those skilled in the arts. Typically, a preparation plant is a plant that washes, sorts, sizes, cleans, and the like a source of carbonaceous material usually in proximity to a carbonaceous material mining operation, for example. Typically, these preparation plants produce smaller-sized carbonaceous material that are not processed further due to the cost of removing them from their carrier fluid stream, such as water. These smaller-sized carbonaceous particles required may be produced from washing the clays, carbonaceous material, and rocks off of the larger sized coal which are generally separated out and discarded using various density related processes at a preparation plant. They are generally discarded because the size of the waste carbonaceous material is too small or not worth the expense to recover it from the preparation plant's process stream, thus this waste carbonaceous material flows with the waste water out to settling ponds where the waste carbonaceous material settles to the bottom of the settling pond and the waste water is later treated. In some instances, the percentage of carbonaceous material in these settling pond streams and/or settling ponds may be between 25%-75% of the entire settling pond depending on the age of the settling pond. In one aspect, the system for refining carbonaceous material may recover the carbonaceous material from a preparation plant's process stream, such as a settling pond stream. In another aspect, the system for refining carbonaceous material may recover the carbonaceous material from an impoundment, such as a settling pond.

The carbonaceous material feedstock production unit 100 may be moved or located nearby a carbonaceous material washery, carbonaceous material processing plant, coal preparation plant, coal mining plant, settling impoundment, settling pond, and the like where it is connected via pipe 102 to a waste stream of a preparation plant or settling pond stream material with water added that contains the smaller-sized carbonaceous material. The pipe 102 is connected to a vibratory screen unit 104 that separates the larger-sized carbonaceous material pieces from the smaller-sized carbonaceous material. In one aspect, the vibratory screen unit 104 includes a series of descending screens of decreasing screen size. The vibratory screen units 104 may include gravity and/or density separation apparatuses, such as teeter beds, waffle tables, jigs, pulsing water beds, steady flow beds, and the like. Thus, the larger-sized carbonaceous material pieces are screened out at the upper screens while the smaller-sized carbonaceous material falls through to the lower parts of the vibratory screen unit 104. In one aspect, one of the intermediate screens may contain the desired size of carbonaceous material. Offsite process water is supplied through pipe 106 to the vibratory screen unit 104 for improved washing and processing at the vibratory screen unit 104.

In one embodiment, the smaller-sized particles and larger-sized particles that exceed a desirable predetermined size of carbonaceous material are removed from the vibratory screen unit 104 via pipes 108 and 110 and may be returned to the preparation plant, for example. Offsite process water may also accompany the undesirable particles exiting the vibratory screen unit 104. For ease of use, the pipes 102, 106, 108, and 110 may be flexible hoses, tubes, pipes, and the like for ease of connecting the carbonaceous material feedstock production unit 100 to the preparation plant. The desirable sized particles exit the vibratory screen unit 104 and flow via pipe 112 to a density differential separator 114. In one embodiment, the density differential separator 114 separates higher-density particles from lower-density particles. Typically, the lower-density particles will contain the desired carbonaceous material particles that will be processed as further described. The higher-density particles typically contain the material and particles that may not be used by the system for refining carbonaceous material.

The desirable-sized particles exit the density differential separator 114 and flow via pipe 122 to another vibratory screen unit 120. In one aspect, the vibratory screen unit 120 may additionally wash the particles and may further dry the carbonaceous material particles that enter the vibratory screen unit 120. Any sized particles that are not of a desired size may exit the vibratory screen unit 120 via pipe 122 and be returned to the preparation plant, for example. The washed and sized carbonaceous material may further be dried by forced air from a dryer 124. In one embodiment, the water content is preferably from about 8% to about 40% w/w, and more preferably from about 12% to about 18% w/w. As described more fully below, carbonaceous material having such a water content may be ideal for the later digestion processes and may eliminate the necessity and cost of re-wetting dried carbonaceous material. This may further save energy that would otherwise be expended to wet completely dry carbonaceous material that is typically supplied to refining plants. In one aspect, the water content may be further reduced at a preparation plant by use of a microwave drying unit and/or centrifuge to lower the expense of transporting the carbonaceous material to an off-site refining plant. In this aspect, the water content of the carbonaceous material may be approximately 7% w/w.

Once the carbonaceous material possesses water at a desired level, it may be transported by a conveyor or other appropriate device to an elevated height to be dropped into storage sacks, vessels, tanks, trucks, containers, and the like (storage containers 128). As described above, since the carbonaceous material feedstock production unit 100 may be movable or portable, the units described above may be mounted on a vehicle, such as a trailer 130. This enables the carbonaceous material feedstock production unit 100 to be moved from one site or preparation plant to another for supplying the later processes described herein with carbonaceous material of a desirable size and water or moisture content, while reducing the waste stream going to settling ponds, for example. In one embodiment, once the storage containers 128 are filled they may be loaded or moved to another vehicle (not shown) and may be transported to a microwave drying unit or digestion unit further described below. In one embodiment, the carbonaceous material feedstock production unit 100 may further include a centrifuge unit 132 for accepting a feed of carbonaceous material from the vibratory screen unit 120 for further reducing the moisture and/or water content of the carbonaceous material.

Figure 2:
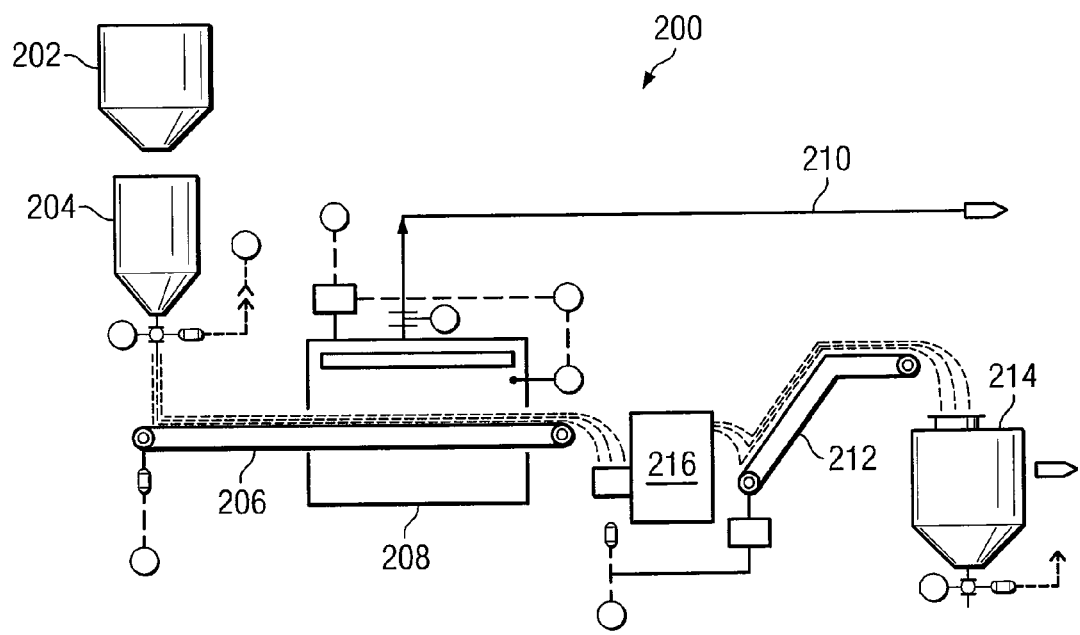
FIG. 2 illustrates a schematic diagram of a microwave drying unit according to an embodiment of the present invention.

FIG. 2 illustrates an embodiment 200 of a microwave drying unit according to the present invention. In one embodiment, the system for refining carbonaceous material includes a microwave drying unit 200 and in another embodiment the system for refining carbonaceous material does not include a microwave drying unit 200. In this embodiment, storage containers 202 and 128 are emptied into a hopper 204 that feeds a conveyor 206 that passes through the microwave unit 208 for providing additional lowering of the water content of the carbonaceous material should it be desired. After exiting the microwave unit 208, the carbonaceous material may be transported via conveyor 212 to a hopper 214 for feeding to the next process unit. Hoppers 204 and 214 may be vibratory hoppers for unsettling clumped together carbonaceous material. In one embodiment, the microwave drying unit 200 may further include a centrifuge unit 216 for accepting a feed of carbonaceous material from the microwave unit 208 for further reducing the moisture and/or water content of the carbonaceous material. In another embodiment, additional centrifuge units may be used with the microwave unit 208, such as just before the microwave unit 208, for example.

Figure 3:
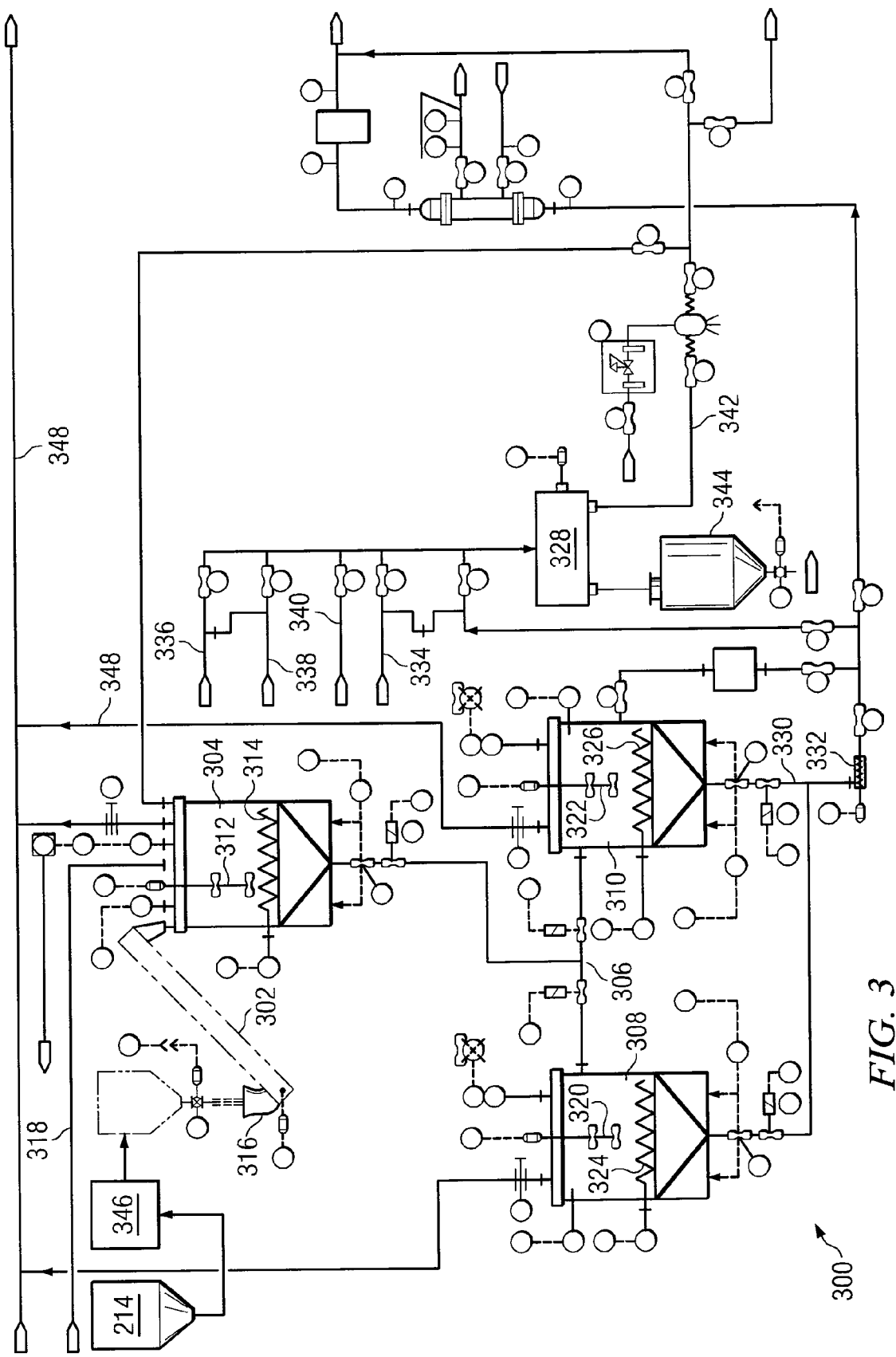
FIG. 3 illustrates a schematic diagram of a digestion unit according to an embodiment of the present invention.

FIG. 3 illustrates an embodiment 300 of a digestion unit according to the present invention. Digestion unit 300 may include a conveyor 302 for transporting the cleaned and sized carbonaceous material to moisture balancing unit 346. The moisture balancing unit 346 may include a source of water and steam that controllably increases the moisture content of the cleaned and sized carbonaceous material. In cases where the moisture content of the carbonaceous material is reduced for transportation purposes, then the moisture balancing unit 346 may add moisture to the carbonaceous material. In one example, the moisture balancing unit 346 may produce carbonaceous material with a preferable moisture content of from about 7% to about 40% w/w, and more preferably a moisture content of from about 25% to about 35% w/w. After the moisture content has been adjusted or balanced in the moisture balancing unit 346, it may be fed to a conveyor 302, which transports the carbonaceous material to one or more digestion vessels 304, 308, and 310.

In one aspect, at the base of the conveyor 302 is a load cell 316 for weighing the carbonaceous material that enters the conveyor 302. Digestion unit 300 includes an acid mixture solution that is transported from an $H_2SiF_6$ adjustment tank 712 (FIG. 7) via pipe 318. The acid mixture solution is fed into the digestion vessel 304, which includes a mixer 312 and a heater 314. The carbonaceous material is fed into the digestion vessel 304 and the digestion of the carbonaceous material is started. A valve 306 may be used to switch the carbonaceous material/acid mixture solution between the digestion vessels 304, 308, and 310. In one aspect, the digestion vessels 304, 308, and 310 may be gravity fed from one to another or pumped by pumps as described herein.

The carbonaceous material and acid mixture solution may then be fed into one of the digestion vessels 308 and 310 where the carbonaceous material is further digested. The digestion vessels 308 and 310 also include heaters 324 and 326, respectively, and mixers 322 and 326, respectively. The heaters 314, 324, and 326 are used to maintain the temperature of the digestion of the carbonaceous material in the digestion vessels 304, 308, and 310. The heaters may be steam fed heat exchangers as are commonly known in the art.

By having downstream digestion vessels 308 and 310, the carbonaceous material/acid solution mixture may be further digested while a new batch is being loaded into digestion vessel 304. Additionally, if a carbonaceous material/acid solution mixture is not in specification, it may be dumped to one of the digestion vessels 308 and 310 for further treating without holding up the digestion in the digestion vessel 304. Further, the carbonaceous material/acid mixture solution may be then moved or pumped to digestion vessel 310, which may be used to further the digestion of the carbonaceous material/ acid mixture solution or may be used as a hold, stage, or surge vessel for feeding a centrifuge 328 via pipe 330, which may have a capacity or volume that is less than the digestion vessels 304, 308, and 310.

In one embodiment, the digestion vessels 304, 308, and 310 further include condensation loops or circuits 348 that may take any acid mixture solution that is vaporized in the digestion vessels 304, 308, and 310. The condensation circuits 348 may include condensation units, such as coolers, for condensing the vapor or gaseous acid mixture solution for storing in the present system for refining carbonaceous material. Separators, commonly known in the art, may further be used to separate the different components or compounds of the acid mixture solution. In another embodiment, catalyst beds may be used with the condensation circuits 348. In one aspect, the acid mixture solution may contain multiple acid compounds, such as HF and $H_2SiF_6$, that may be separated from each other by use of temperature controlled separators that separate the different compounds by temperature specific distillation. This separation may be controlled by controlling the temperature and ratio of the acid compounds within the separators. In addition, the metals digested out of the carbonaceous material may be precipitated at different pH levels and then filtered from the carbonaceous material/acid mixture solution.

In the above described embodiment, the present system for refining carbonaceous material may include multiple digestion vessels that are in series, one feeding the carbonaceous material/acid mixture solution to another downstream digestion vessel. In this embodiment, the carbonaceous material/acid mixture solution may be batched in a way to have a continuous flow downstream, which may be important for feeding a continuous centrifuge 328 via pipe 330, for example.

In another embodiment, the present system for refining carbonaceous material may include one digestion vessel by itself, such as digestion vessel 304. In this embodiment, no further downstream digestion vessels are fed the carbonaceous material/acid mixture solution and it is fed directly to a centrifuge 328, for example.

In yet another embodiment, the present system for refining carbonaceous material may include multiple digestion vessels that are in parallel that feed concurrently or simultaneously the carbonaceous material/acid mixture solution to the centrifuge 328, for example. In this embodiment, the digestion vessels 304, 308, and 310 are each individually fed the carbonaceous material/acid mixture solution from the conveyor 302.

Preferably, the acid mixture solution comprises HF and $H_2SiF_6$ in a range of proportions. In one example, the HF is present in a range preferably from about 2% to about 20% w/w, and more preferably from about 5% to about 15% w/w. The $H_2SiF_6$ is present in a range preferably from about 10% to about 58% w/w. Preferably, the HF is present in a range of from about 5% to about 12% w/w, and more preferably in the range of from about 8% to about 10% w/w and the $H_2SiF_6$ is present in a range preferably from about 30% to about 38% w/w, and more preferably from about 22% to about 32% w/w. The balance of the mixture is water. So for example, an acid mixture solution that includes 10% HF and 35% $H_2SiF_6$ will have a $H_2O$ content of 55% taking into account the moisture of the carbonaceous material being fed into the digestion vessels, in one aspect. Preferably, the acid mixture solution includes these mixed portions of HF and $H_2SiF_6$ prior to mixing them with the carbonaceous material.

In another embodiment, a fluorine acid solution can be prepared from a solution of $H_2SiF_6$ plus $H_2O$ as the base acid to which anhydrous HF acid is added so that both of these reactive acids are in one solution. Some exemplary ranges of the acids are from about 5%-34% w/w $H_2SiF_6$, 32%-90% w/w $H_2O$, and 5%-34% w/w HF acid. In one aspect, a fluorine acid solution is prepared from a saturated solution of $H_2SiF_6$ in water and adding gaseous anhydrous HF acid. In another embodiment, $SiF_4$ may be reacted with $H_2O$ to form $H_2SiF_6$.

In one embodiment, the digestion vessels 304, 308, and 310 may be operated at temperatures of from about 10° C. to about 125° C. and at a pressure of from about 0 kPa to about 105 kPa. In another embodiment, the temperature of the digestion vessels 304, 308, and 310 may be preferably in the range of from about 55° C. to about 85° C., and more preferably in the range of from about 70° C. to about 85° C.

In one embodiment, the carbonaceous material/acid mixture solution is agitated or stirred in the digestion vessels 304, 308, and 310 for preferably from about 20 to about 80 minutes, and more preferably from about 40 to about 60 minutes.

The digestion vessels 304, 308, and 310 may be made of a material that withstands the chemicals contained in them. For example, the digestion vessel 304 may be made from a blend of plastic and carbon fiber composites or any structural material lined with any material that is impervious to the corrosive effects of the acid used.

The treated carbonaceous material has a specific gravity lower than the carbonaceous material/acid mixture solution, thus the treated carbonaceous material may float to the top of the carbonaceous material/acid mixture solution in the digestion vessels 304, 308, and 310 when the mixers 312, 322, and 324 are turned off. Unreacted iron sulfide and other un-dissolved heavy metal salts whose specific gravities are greater than the acid mixture solution may fall to the bottom of the digestion vessels 304, 308, and 310 if the agitation is stopped by turning off the mixers 312, 322, and 324. In one embodiment, the specific gravity of certain carbonaceous material, such as coal, is approximately 1.3 and the acid mixture solution is approximately 1.2 when entering the digestion vessel. After digestion, the carbonaceous material then typically has a specific gravity of 1.1 and the specific gravity of acid solution is 1.2 entering the centrifuge 328. In addition, during the separation process, the treated carbonaceous material acts as a filter to the metal fluorides and/or metal fluorosilicates that are contained in the acid mixture solution.

In one embodiment, the pipe 330 is connected to a pump 332 that pumps the carbonaceous material/acid mixture solution to the centrifuge 328. Preferably, the pump 332 pumps the carbonaceous material/acid mixture solution without degrading the particle size. In one aspect, the pump 332 is a peristaltic pump.

In one aspect, the centrifuge 328 may include several different stages. For example, it may spin at a speed sufficient to remove the acid mixture solution from the carbonaceous material in a first stage. In a second stage, water supplied from a de-ionized water supply 336 and/or a rinse water supply 334 may be used in washing the carbonaceous material. Preferably, this rinse water may be applied to the carbonaceous material while it is being spun inside of the centrifuge 328. The water used in this cycle may be heated before it is input into the centrifuge 328. For example, the water may be in a temperature preferably from about 30° C. to about 100° C., and more preferably 75° C. to about 85° C. Then, the centrifuge 328 may remove this wash water where it can be recycled after being filtered through a filtration apparatus in this second stage. The rinse water that is removed from the centrifuge 328 is sent for recycling via pipe 342 as described below. In another embodiment, the wash water removed from the centrifuge 328 may be sprayed on the carbonaceous material prior to it entering the digestion vessels 304, 308, and 310 in the moisture balancing unit 346 as the moisture content of the incoming carbonaceous material is lower than desired prior to digestion as described herein. The filtration apparatus removes some of the metal fluorides and metal chlorides, which may be sold to other markets, such as aluminum and steel plants.

Preferably, the third stage includes injecting steam into the centrifuge 328 during a spinning process. In one embodiment, the temperature within the centrifuge 328 is preferably from about 120° C. to about 400° C. and the quantity of steam that is applied to the carbonaceous material in the centrifuge 328 may be determined by several factors, including the size or carbonaceous material particles and the speed of drum inside the centrifuge 328 to prevent slumping of the carbonaceous material within the centrifuge 328. The steam helps in removing any residual fluorides. For example, the amount of steam applied to the carbonaceous material may be determined by the residual level of fluorine required in the finished carbonaceous material. For instance, an isotrope of HF, $H_2SiF_6$, and $H_2O$ may vaporize preferably from about 105° C. to about 120° C. depending on the concentrations of the individual compounds. Thus, by providing steam into the centrifuge 328 the residual HF, $H_2SiF_6$, and $H_2O$ are driven off of the carbonaceous material as a vapor and recovered later via pipe 342, for example, the steam process may also start the drying stage of the present system for refining carbonaceous material.

The centrifuge 328 may further include scrapers that remove the carbonaceous material from the centrifuge 328 by scraping the carbonaceous material as it is spinning inside the centrifuge 328. Thus, the carbonaceous material exits the centrifuge 328; the carbonaceous material is then moved to a hopper 344 via a conveyor. In one aspect, it may be important not to use any conveyance means that will degrade the carbonaceous material to prevent the creation of smaller undesirable fines. The moisture content of the carbonaceous material at this point may be from about 4% to about 12% w/w.

Figure 5:
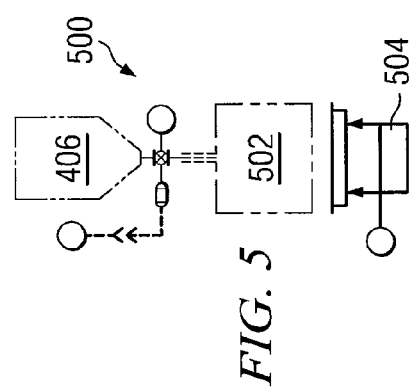
FIG. 5 illustrates a schematic diagram of a packaging and product unit according to an embodiment of the present invention.
Figure 4:
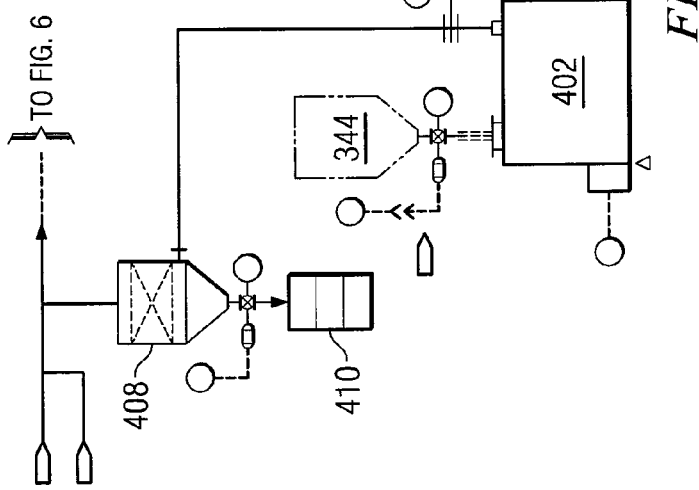
FIG. 4 illustrates a schematic diagram of a fluidized bed dryer unit according to an embodiment of the present invention.

FIG. 4 illustrates an embodiment 400 of a drying unit according to the present invention. The drying unit 400 includes a dryer 402 that may further dry the carbonaceous material produced by the digestion unit 300. The carbonaceous material from the hopper 344 is fed into the dryer 402 where the carbonaceous material is subject to air flow of a desired velocity and temperature. After a residence time the carbonaceous material then exits the dryer 402 and is fed to a hopper 406 where it may be elevated above a final packaging and product unit 500 that may include a load cell or scale 504 for weighing the finished carbonaceous material that is placed in a storage container 502 as shown in FIG. 5, or sent to bulk storage, where the almost pure and dried carbonaceous material is ready for the next stage, fuel, activation and the like.

In one embodiment, dryer 402 may be a fluidized bed that is generally a density dependent unit, like a teeter bed, that has air flowing from the bottom to the top of the fluidized bed dryer that pulls the lighter carbonaceous material out the top of the fluidized bed dryer for transfer to drum 410 by a cyclone 408. The carbonaceous material particles are suspended in the air flow based on their density and are dried further by this process. The medium-sized carbonaceous material particles that do not flow out the top of the fluidized bed dryer are recovered at the bottom of the fluidized bed dryer for transfer on conveyor 404. The fluidized bed dryer includes a weir that controls the height of carbonaceous material inside the fluidized bed dryer. Conveyor 404 may be a vacuum conveyor as is known in the art. In one aspect, the smaller-sized carbonaceous material particles that exit the top of the fluidized bed dryer may be approximately 200 microns or smaller. To control the separation of the particle sizes through the fluidized bed dryer, the air flow may be adjusted. A higher air flow through the fluidized bed dryer will produce larger-sized carbonaceous material particles exiting the top of the fluidized bed dryer, while a lower air flow will produce smaller-sized carbonaceous material particles exiting the top of the fluidized bed dryer. In addition, the smaller-sized carbonaceous material particles may be fed into storage container, such as sacks and the like.

In another embodiment, the dryer 402 may be a number of designs so long as there is air flow and carbonaceous material movement, the temperature of the dryer 402 may be preferably in the range from about 100° C. to about 160° C., more preferably from about 120° C. to about 140° C., the temperature may be high enough to drive off most of the moisture and some of the tars in order to liberate the residual fluorine to a level close to the inherent value of the original carbonaceous material.

Figure 6:
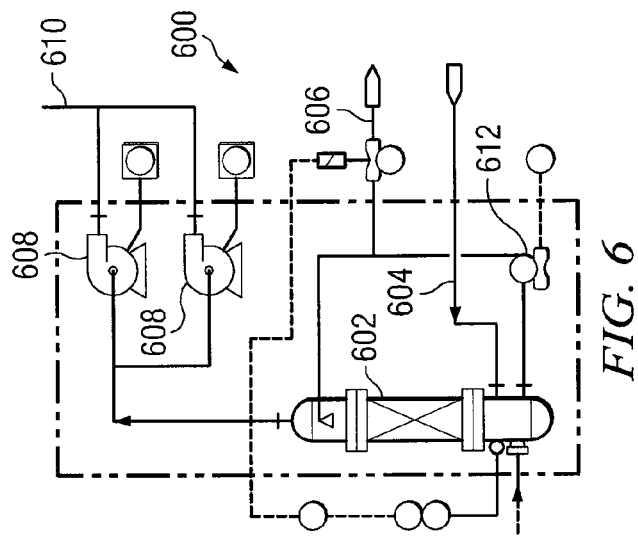
FIG. 6 illustrates a schematic diagram of a vapor recovery unit according to an embodiment of the present invention.

FIG. 6 illustrates an embodiment 600 of a vapor recovery unit 600 according to the present invention. The process water produced by the system for refining carbonaceous material may be fed to a scrubber 602 where air is pulled through the scrubber 602 to remove any additional light volatile vapors from the process water. The air flow through the scrubber 602 is provided by blowers 608 which are fed to a stack 610. The stripped process water may be returned to the top of the scrubber 602 via pump 612. Additionally, the stripped process water may be fed to the moisture balancing unit 346 to be used as a feedstock for increasing the moisture content of the carbonaceous material within the moisture balancing unit 346.

Figure 7:
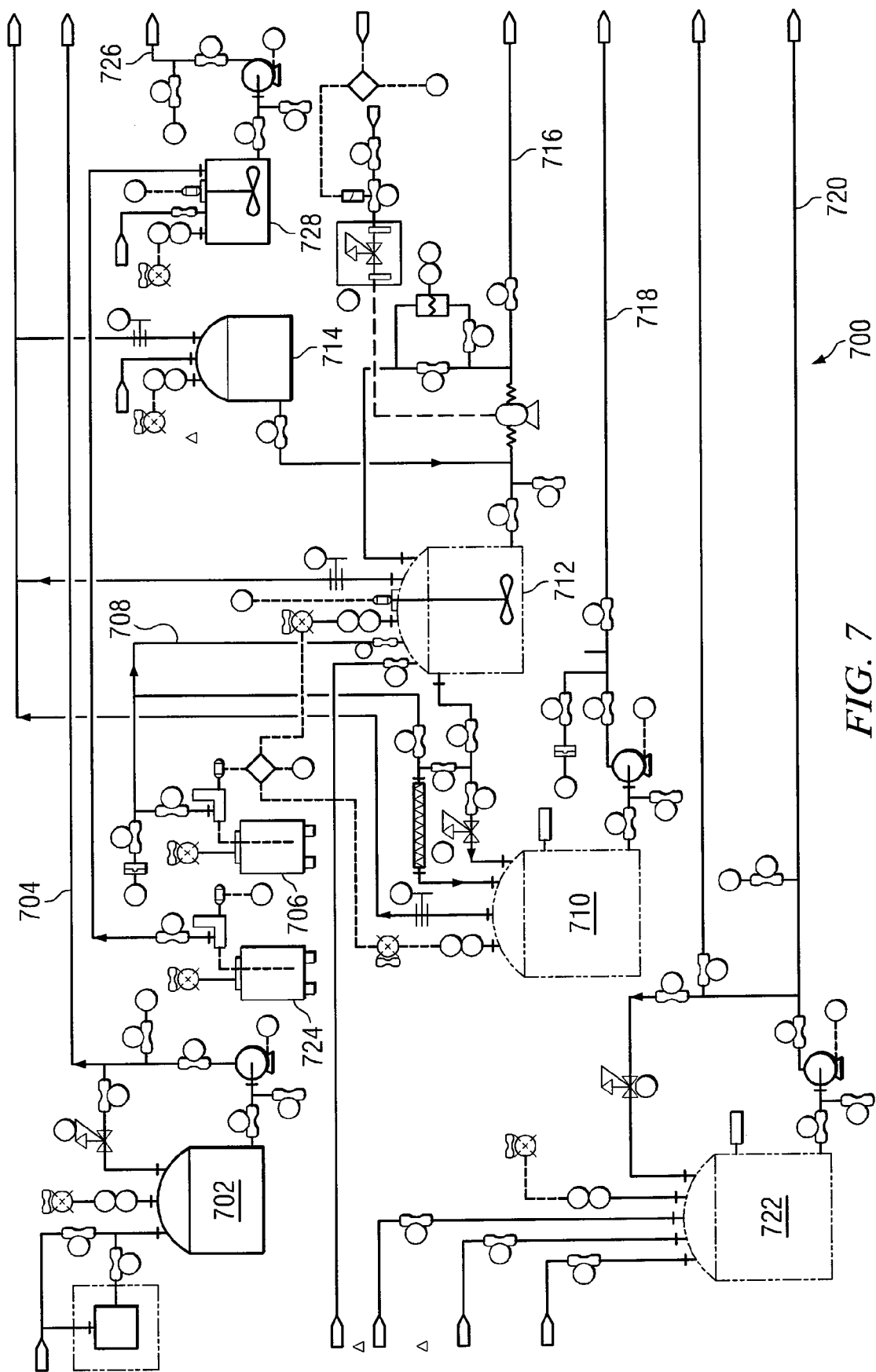
FIG. 7 illustrates a schematic diagram of a feedstock storage unit according to an embodiment of the present invention

FIG. 7 illustrates an embodiment 700 of a feedstock storage unit according to the present invention. The feedstock storage unit 700 includes a de-ionized water storage tank 702 for holding de-ionized water that is used in the system for refining carbonaceous material. For example, de-ionized water is fed from de-ionized water storage tank 702 to centrifuge 328 via pipe 704. Feedstock storage unit 700 further includes a HF storage tank 706 that feeds HF acid via pipe 708 to a HF adjustment tank 710 and a $H_2SiF_6$ adjustment tank 712 may further include heaters to heat their respective acid mixture solutions after blending the acid mixture solution to a desirable strength. The $H_2SiF_6$ adjustment tank 712 may further be fed $H_2SiF_6$ in a more concentrated form that is stored in a $H_2SiF_6$ storage tank 714. Once the desired strength of acid mixture solution is achieved, then it is piped via pipe 716 to digestion vessel 304 for mixing with carbonaceous material. In addition, HF adjustment tank 710 may feed a reduced strength of HF to the centrifuge 328 via pipe 718. Also, feedstock storage unit 700 may further include a rinse water collection tank 722 that contains rinse water collected from the system for refining carbonaceous material. This rinse water may be fed to centrifuge 328 via pipe 720. Additional vessels 724 and 728 may be used to contain caustic compounds, such as bases, for neutralizing any acid spills or reducing the strengths of the acids of the system for refining carbonaceous material. Such bases may be fed to the digestion vessel 304 via pipe 726.

Figure 8:
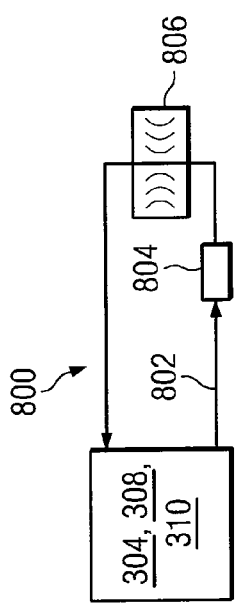
FIG. 8 illustrates a schematic diagram of an ultrasonic unit according to an embodiment of the present invention.

FIG. 8 illustrates an embodiment 800 of an ultrasonic unit according to the present invention. In one embodiment, the digestion vessels 304, 308, and 310 may include a pipe 802 that takes a stream of the carbonaceous material/acid mixture solution and pumps it through the pipe 802 through a source of ultrasonic waves 804 for improved penetration of the acid mixture solution into the micropores and macropores of the carbonaceous material. In one aspect, the source of ultrasonic waves 804 may be a water bath that is subject to a source of such ultrasonic waves, thus imparting the ultrasonic waves through the pipe 802 for improved penetration of the acid mixture solution. In one embodiment, the wave signals are square to improve such penetrating and digesting action.

Figure 9:
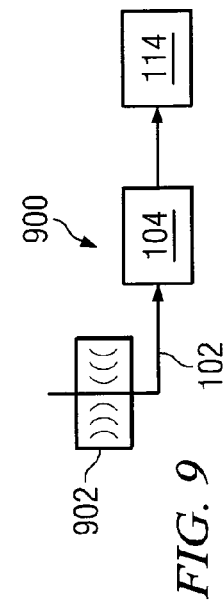
FIG. 9 illustrates a schematic diagram of an ultrasonic unit according to another embodiment of the present invention.

FIG. 9 illustrates an embodiment 900 of an ultrasonic unit according to the present invention. In this embodiment, a source of ultrasonic waves 902 is placed upon the pipe 102 prior to entering the vibratory screen unit 104.

In one embodiment, the frequency of the source of ultrasonic waves 804 and 902 is from about 80 KHz to about 100 KHz. In one example, an opening of a macropore of carbonaceous material may be approximately 1 micron and it has been found that a frequency of 100 KHz source of ultrasonic waves 804 and 902 will cause the acid mixture solution to penetrate the macropore opening. Additionally, as the acid mixture solution is pumped into the macropores of the carbonaceous material, pressure is created within the macropore causing the acid mixture solution to be pumped out once the pressure becomes greater within the macropore than outside the macropore. This pumping action provides for improved penetration and digestion of contaminants of the carbonaceous material. The source of ultrasonic waves 804 and 902 may be generated by ultrasonic transducers as well known in the art. In one aspect, these transducers may be in contact or communication with a water bath, which transfers the wave action to the water, which then transfers the wave action to the pipe, and so on, to provide the pumping action to the micropore and macropores of the carbonaceous material. This reduces the need for mechanical agitation and provides for improved digestion times. The frequency of the source of ultrasonic waves 804 and 902 causes cavitations, cavitation bubbles, and/or cavity bubbles within the acid mixture solution such that they are the size or smaller than the typical openings of the macropores of the carbonaceous material. In general, the higher the frequency the smaller the cavitation bubbles. If the cavitation bubbles are too large, they may tend to pulverize the carbonaceous material to smaller sizes that may not be desirable to the process. In one embodiment, source of ultrasonic waves 804 and 902 are capable of producing power from about 250 watts to about 16,000 watts with a frequency of from about 10 KHz to about 50 KHz. The ultrasonication may be performed at an increased pressure over ambient pressure using a feed pump and adjustable back-pressure valve next to the pipe where it is desired to operate.

Figure 10:
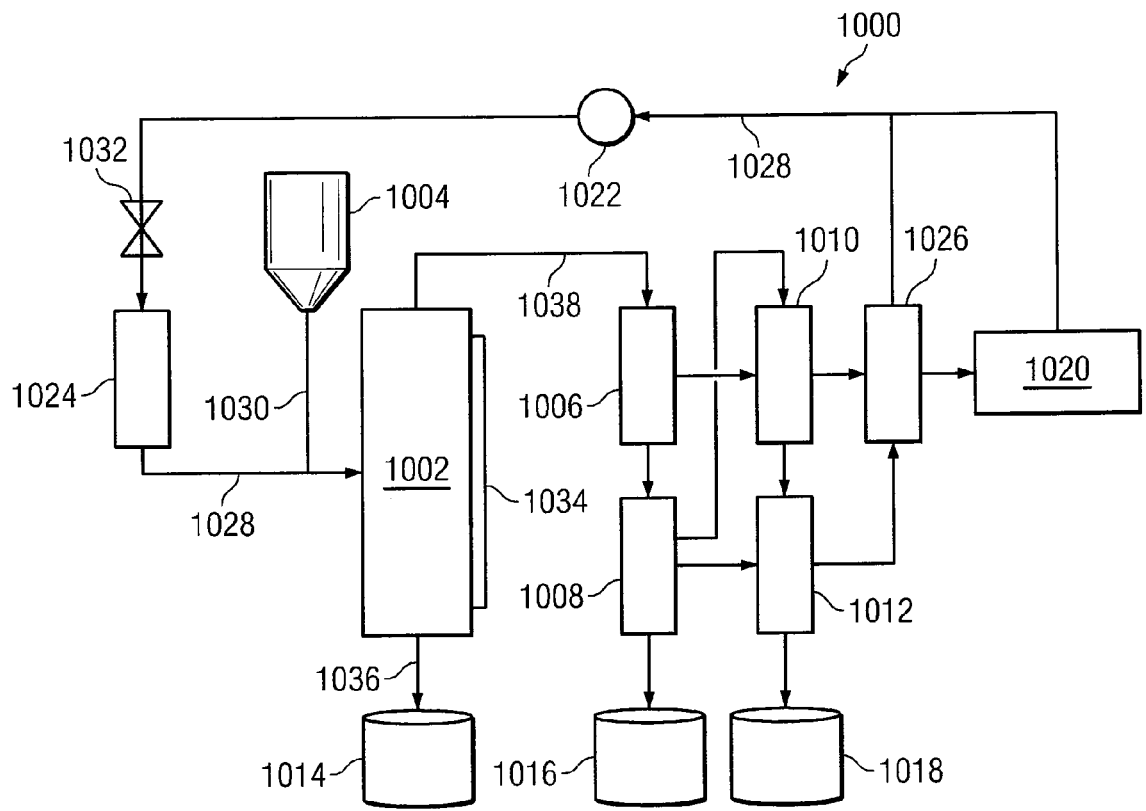
FIG. 10 illustrates a schematic diagram of a system for making low volatile carbonaceous matter according to an embodiment of the present invention.

In addition to the aforementioned aspects and embodiments of the present system for refining carbonaceous material, the present invention further includes a system for making low volatile carbonaceous matter. The present system for making low volatile carbonaceous matter devolatilizes the carbonaceous material and recovers the volatile matter for subsequent use in a variety of applications. FIG. 10 illustrates an embodiment 1000 of a system for making low volatile carbonaceous matter according to the present invention. In one embodiment, the system for making low volatile carbonaceous matter 1000 preferably includes a source of sized and digested carbonaceous material, such as the system for refining carbonaceous material as described herein. In this embodiment, the system for making low volatile carbonaceous matter 1000 produces digested carbonaceous material, such as coal, of a desirable size that is fed into an extraction vessel 1002 via pipe 1030. The extraction vessel 1002 is a vessel made from a material that is resistant to the coal and supercritical carbon dioxide fluid ("$SCCO_2$ fluid"). In this embodiment, the extraction vessel 1002 is further capable to withstand the higher pressures associated with $SCCO_2$ extraction. Additionally, the system for making low volatile carbonaceous matter 1000 preferably includes a supply of digested carbonaceous material, such as produced by the system for refining carbonaceous material described herein and designated 1004 in FIG. 10.

A supply of $SCCO_2$ fluid may be stored in a vessel 1020 that supplies the $SCCO_2$ fluid to a pump 1022 via pipe 1028. The $SCCO_2$ fluid may be in a liquid state as in the vessel 1020. The pump 1022 compresses the $SCCO_2$ fluid and may feed it to a heater 1024. The $SCCO_2$ fluid may then be fed into the extraction vessel 1002 via pipe 1028 where it contacts the carbonaceous material preferably processed by the system for refining carbonaceous material. The carbonaceous material is preferably fed to the extraction vessel 1002 via pipe 1030. Preferably, a valve 1032 controls the amount of $SCCO_2$ fluid that is fed to the heater 1024 and extraction vessel 1002. The extraction vessel 1002 may include a heater 1034 as well to control the temperature and pressure of the $SCCO_2$ fluid and carbonaceous material within the extraction vessel 1002. The extraction vessel 1002, heater 1034, and valve 1032 may maintain the $SCCO_2$ fluid at supercritical fluid temperatures and pressures for proper extraction.

The extraction vessel 1002 is generally made of a strong material, such as metal, and is shaped as a container with an inlet connected to pipe 1028 for inputting the carbonaceous material and $SCCO_2$ fluid. Additionally, the extraction vessel 1002 may contain a carbonaceous material outlet that is connected to pipe 1036 for feeding the carbonaceous material after is has been extracted by the extraction vessel 1002 to a carbonaceous material storage vessel 1014. The extraction vessel 1002 may further include an outlet connected to pipe 1038 for feeding the $SCCO_2$ fluid with extracted soluble hydrocarbons ("extract solvent") to separator 1006.

After the carbonaceous material has been contacted with the $SCCO_2$ fluid for a desired period of time, the $SCCO_2$ fluid extracts soluble hydrocarbons from the carbonaceous material to produce the extract solvent, which may be fed to separator 1006. At this point, the carbonaceous material, extracted of soluble hydrocarbons, may be fed through extraction vessel 1002 to the carbonaceous material storage vessel 1014. The system for making low volatile carbonaceous matter 1000 may include a series of separators for improved production of hydrocarbon cuts with distinct or different densities and/or boiling points as known to those skilled in the art. The separator 1006 may feed a portion of its input to separator 1008, which may in turn feed a portion of its input to separator 1010, which may in turn feed a portion of its input to separator 1012. Flow restrictors may be used with separators 1006, 1008, 1010, and 1012 to control the flow or release of extract solvent.

The separators 1006, 1008, 1010, and 1012 may further include heaters to control the temperature of the separators. Due to the temperatures in the separators 1006, 1008, 1010, and 1012, the extract solvent may become $CO_2$ gas which may be fed to condenser 1026. The $CO_2$ gas may then be condensed back into a liquid for feeding to the vessel 1020. As described above, the extract solvent is a mixture of $SCCO_2$ fluid and $SCCO_2$ fluid soluble hydrocarbons. The $SCCO_2$ fluid may be separated from the extract solvent by having operating conditions within the separators 1006, 1008, 1010, and 1012 such that the ratio of the $SCCO_2$ fluid vapor pressure to soluble hydrocarbons vapor pressure is as high as possible. This ratio will typically increase as the temperature decreases with the result that the optimum temperature is very low and limited by the vapor pressure-temperature characteristic of the $SCCO_2$ fluid or freezing point of the soluble hydrocarbons. In one aspect, the liquid $CO_2$ may be recycled back to the vessel 1020 by compressing $CO_2$ from a gas phase to a liquid phase.

In addition, the temperatures and pressures of the separators 1006, 1008, 1010, and 1012 may be controlled such that different cuts of the soluble hydrocarbons are produced. For example, the operating conditions within the separators 1006 and 1008 may be controlled to provide a lighter cut of hydrocarbons, such a thin carbon pitch, that may be stored in carbon pitch storage vessel 1016. In another example, the operating conditions within the separators 1006, 1008, 1010, and 1012 may be controlled to provide a heavier cut of hydrocarbons, such as thick carbon pitch, that may be stored in carbon pitch storage vessel 1018.

In one embodiment, the extraction process is carried out under pressure and temperature conditions that lie above the critical point of the $SCCO_2$. For example, these pressures are from about 73 atm to about 300 atm and at temperatures of from about 32° C. to about 300° C.

In one embodiment, the system for making low volatile carbonaceous matter 1000 further includes a secondary solvent that may be mixed with the $SCCO_2$ fluid prior to being fed into extraction vessel 1002. For example, a hydrocarbon may be mixed with the $SCCO_2$ fluid prior to being fed into the extraction vessel 1002. Some exemplary secondary solvents include ethane, propane, trifluoro-chloromethane, difluoro-dichloromethane, trifluoro-bromoethane, methyl fluoride, ethylene, propylene, isobutene, n-pentane, isopentane, tetramethylmethane, n-heptane, isoheptane, and the like. Preferably, the secondary solvent is in a liquid state and miscible with the $SCCO_2$. In one aspect, it is important that the secondary solvent is miscible with the $SCCO_2$ fluid and has a gas phase temperature that is close to that of the $SCCO_2$ fluid. This assists in the recovery of the dissolved compounds.

Figure 11:
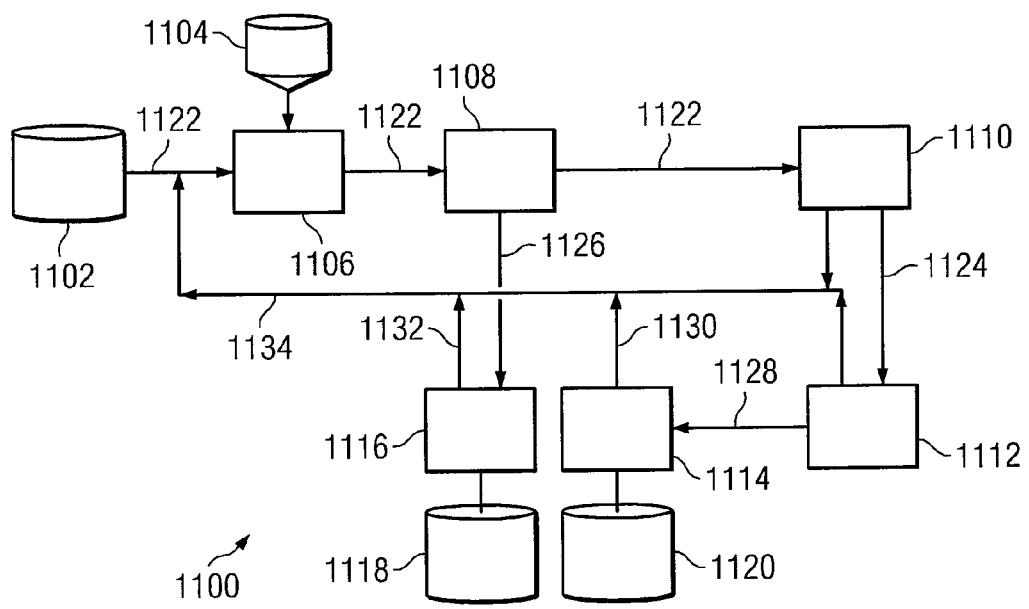
FIG. 11 illustrates a schematic diagram of a solvent extraction unit according to an embodiment of the present invention.

FIG. 11 illustrates an embodiment 1100 of a solvent extraction unit of the present invention. The solvent extraction unit 1100 includes a source of dipolar aprotic solvent, such as N-Methyl-2-Pyrrolidone ("NMP") 1102, that may contain a supply NMP that is fed through a pipe 1122 to an extraction vessel 1106 where it contacts a supply of carbonaceous material. In one embodiment, the supply of carbonaceous material is sized and digested, such as by the system for refining carbonaceous material 1104 as described herein. Preferably, the carbonaceous material is mixed with the NMP in a ratio of from about 1:10 to about 1:1, carbonaceous material to NMP. In one aspect, extraction vessel 1106 is a continuous process vessel. A slurry of NMP/extract and carbonaceous material is produced in the extraction vessel 1106 and is fed to a separation unit 1108 via pipe 1122. Some other exemplary diprotic aprotic solvents include dimethylformamide, dimethylacetamide, and dimethyl sulfoxide. For example, typical extraction conditions may include having an operating pressure of approximately 5,000 psi at a temperature of approximately 80° C. These conditions may further include contacting approximately a ratio of 2:1 of the NMP to solid carbonaceous material. The NMP may also include a secondary solvent, such as toluene. The extraction may be a combination of static and dynamic contact operations, such as 10 minutes of dynamic contact followed by 30 minutes of static contact. Further, a hydrocarbon, such as ethanol in a ratio of approximately 5:1 to the carbonaceous material may be used to as a rinse.

The solvent extraction unit 1100 further includes a separation unit 1108 that separates the NMP from the extract and carbonaceous material. In one aspect, the separation unit 1108 may be a centrifuge or filtration unit that is capable of separating the extract and carbonaceous material, which may be in the form of activated carbon at this stage. In one aspect, the extract is filtered from the carbonaceous material; the extract filtrate is fed to an extraction unit 1110 via pipe 1122. The extraction unit 1110 preferably separates a stream of NMP from an extract mixture. The stream of NMP may be fed back to the extraction vessel 1106 as recycled NMP via pipe 1134. The extract mixture may be fed to a dryer unit 1112 via pipe 1124 for further removal of the NMP, which may then be fed back to the pipe 1134. The dryer unit 1112 provides temperatures that are sufficient to drive off the NMP from the extract mixture in excess of approximately 202° C. The NMP vapors from this dryer may be condensed and reconstituted for additional or subsequent use.

In one embodiment, the extract mixture from the dryer unit 1112 is fed via pipe 1128 to a secondary vacuum separation unit 1114. Secondary vacuum separation unit 1114 further separates the extract mixture into NMP by providing a vacuum collection system while the tars are cooled to a temperature above their free flow point of approximately 100° C., which is fed to the pipe 1134, and carbon pitch material that is collected in carbon pitch storage vessel 1120.

In one embodiment, a coal waste stream from the separation unit 1108 is fed via pipe 1126 to a secondary extraction unit 1116 where the NMP is separated from the coal waste stream and fed to pipe 1134. The unit 1116 further provides a stream of activated carbon that is stored in activated carbon storage vessel 1118. Generally, the secondary extraction unit 1116 may provide additional extraction functionality similar to that discussed above relating to secondary vacuum separation unit 1114.

Figure 12:
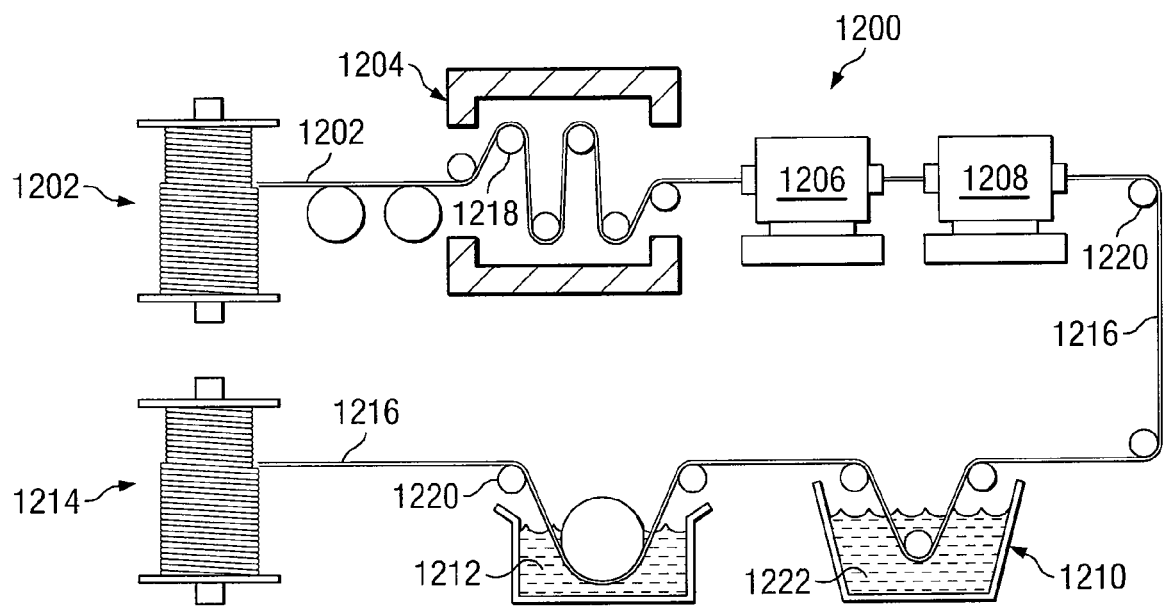
FIG. 12 illustrates a schematic diagram of a carbon fiber production unit according to an embodiment of the present invention.

FIG. 12 illustrates an embodiment 1200 of a carbon fiber production unit according of the present invention. The carbon fiber production unit 1200 includes a source of carbon pitch fiber 1202 made from a carbon pitch, such as from the solvent extraction unit 1100 or system for making low volatile carbonaceous matter 1000 described herein. In one embodiment, the carbon pitch from the carbon pitch storage vessel 1120 may be drawn into long fibers or strands and then spun into using any conventional method known to those skilled in the art. In another aspect, individual strands or fibers are subjected to the process herein described. The carbon fiber production unit 1200 may further include additional vessels for washing and cleaning the stretched carbon pitch fiber 1202. Generally, the carbon pitch fiber 1202 is stretched to a desired fiber diameter that helps align the molecules within the fiber prior to additional processing as described herein. Many individual fibers or strands are typically woven or bundled together to make a carbon pitch fiber 1202 of a desirable thickness or diameter. The supply of carbon pitch for the carbon pitch fiber 1202 may be carbon pitch storage vessels 1120, 1016, and 1018.

The carbon fiber production unit 1200 further includes a stabilizing unit 1204 that assists with chemically altering or converting the linear atomic bonding of the carbon pitch fiber 202 to a more thermally stable ladder bonding. The stabilizing unit 1204 may include a plurality of rollers 1218 that are used to draw the carbon pitch fiber 1202 through the stabilizing unit 1204. In one aspect, the rollers 1218 may be heated rollers that are heated by the heaters of the stabilizing unit 1204. The heaters of the stabilizing unit 1204 generally operate at a temperature of from about 200° C. to about 300° C. Air containing oxygen molecules may be present in the stabilizing unit 1204 that are picked up by the carbon pitch fiber 1202 that assists with rearranging their atomic bonding pattern. In one aspect, the carbon pitch fiber 1202 is heated for a duration of from about 10 minutes to about 240 minutes, depending on the desired product. The stabilizing unit 1204 may further include beds of loose materials where the carbon pitch fiber 1202 is passed through by rollers 1218.

The carbon pitch fiber 1202 then exits the stabilizing unit 1204 and is then fed to a carbonizing unit 1206. The carbonizing unit 1206 includes heaters that produce temperatures of from about 1,850° C. to about 5,500° C. The carbon pitch fiber 1202 is exposed to this temperature for a duration of about 2 minutes to about 20 minutes. Preferably, the carbonizing unit 1206 contains a gas mixture that does not contain oxygen. The lack of oxygen prevents the carbon pitch fiber 1202 from burning in the high temperatures of the carbonizing unit 1206. In one aspect, the gas pressure within the carbonizing unit 1206 is greater than that outside the carbonizing unit 1206 to prevent oxygen from entering the interior of the carbonizing unit 1206. Further, seals may be used at the entrance and exit of the carbonizing unit 1206 to prevent oxygen from entering the interior of the carbonizing unit 1206. The temperature within the carbonizing unit 1206 provides energy to strip non-carbon atoms and some carbon containing compounds, such as carbon dioxide, from the carbon pitch fiber 1202. As the these elements and compounds are removed from the carbon pitch fiber 1202, the remaining carbon atoms begin to pack or bond more tightly providing for improved crystal alignment. In one embodiment, the carbon fiber production unit 1200 further includes an additional graphitizing unit 1208 for providing additional heating to the carbon pitch fiber 1202 for better temperature control of the carbonizing process. The graphitizing unit 1208 may have similar operating parameters, but it may be operated at slightly higher or lower temperatures than the carbonizing unit 1206. After the carbon pitch fiber 1202 has been carbonized and graphitized the carbon pitch fiber 1202 will be generally referred to as carbon fiber 1216.

The carbon fiber production unit 1200 preferably also includes a plurality of rollers 1220 located throughout the carbon fiber production unit 1200 to transport the carbon fiber 1216 through the different units described herein. The carbon fiber production unit 1200 may further include a surface treatment unit 1210 that treats the outside surface of the carbon fiber 1216 to improve its bonding capacity to other materials, such as epoxies and the like, used in composite material manufacture. The surface treatment unit 1210 may slightly oxidize the outside of the carbon fiber 1216 by adding oxygen atoms to the outside of the carbon fiber 1216. The carbon fiber 1216 may be immersed in various gases and/or liquids, such as air, carbon dioxide, ozone, sodium hypochlorite, or nitric acid. The carbon fiber 1216 may be coated electrolytically by applying a potential across the carbon fiber 1216, such as a positive potential, in a bath 1222 filled with electrically conductive materials.

In one embodiment, the carbon fiber 1216 may be coated in a sizing unit 1212 to protect them from damage during a subsequent winding or weaving process. The coating materials are generally selected to be compatible with a particular adhesive that will be used to form a composite material. Some exemplary coating materials include: epoxy, urethane, nylon, and the like. In one aspect, the carbon fiber 1216 is then wound around a bobbin or spool 1214 prior to being used in a composite manufacturing process as is commonly known in the art.

Figure 13:
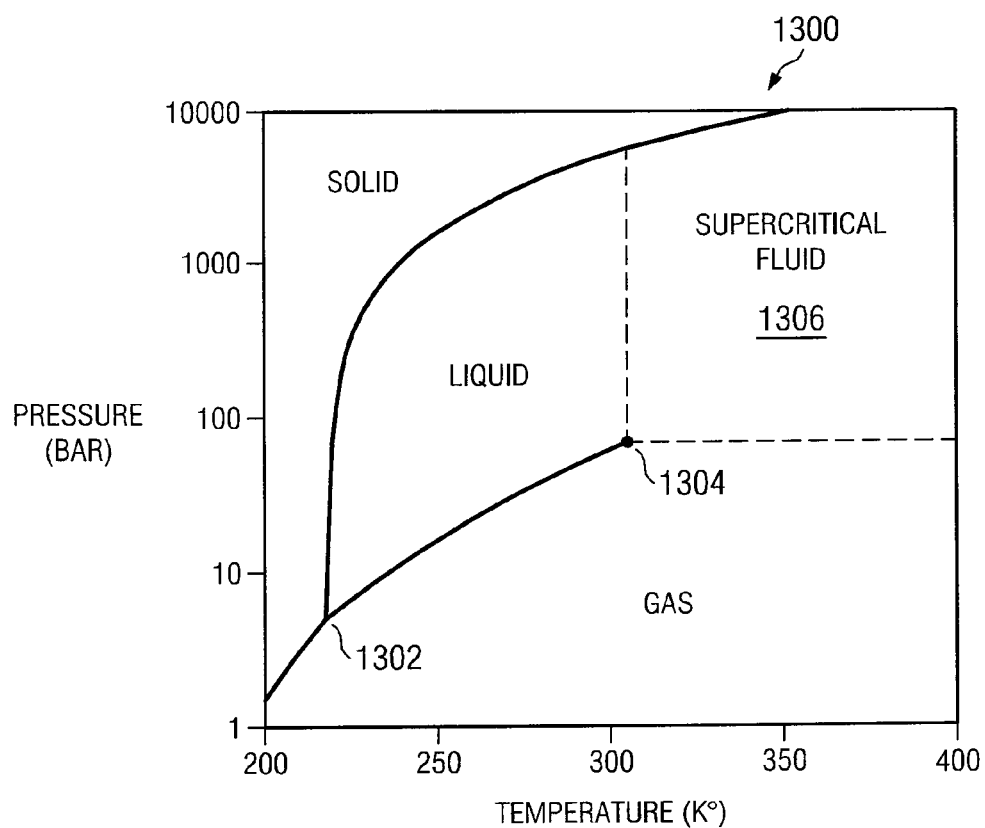
FIG. 13 is a pressure-temperature phase diagram of $CO_2$ for determining a desired pressure and temperature of $CO_2$ according to an embodiment of the present invention.

FIG. 13 illustrates an embodiment 1300 of a phase diagram for $CO_2$ for determining a desired pressure and temperature for the $CO_2$. As shown, $CO_2$ behaves as a gas at pressures and temperatures below standard temperature and pressure ("STP"), which is 273 K at 1 bar. A triple point 1302 for $CO_2$ is shown where $CO_2$ may exists in a gas, liquid, or solid phase with slight variations in temperature and/or pressure. When the temperature and pressure are increased to beyond the critical point 1304, then the $CO_2$ behaves as a supercritical fluid, $SCCO_2$, meaning it adopts properties between a liquid and a gas. The critical point 1304 for $CO_2$ has a critical temperature of 31.1° C. and a critical pressure of 74 bar. For the purposes of the present invention, the $SCCO_2$ may be at a temperature and pressure above the critical point 1304 in the supercritical fluid area of the phase diagram 1300 designated 1306.

Figure 14:
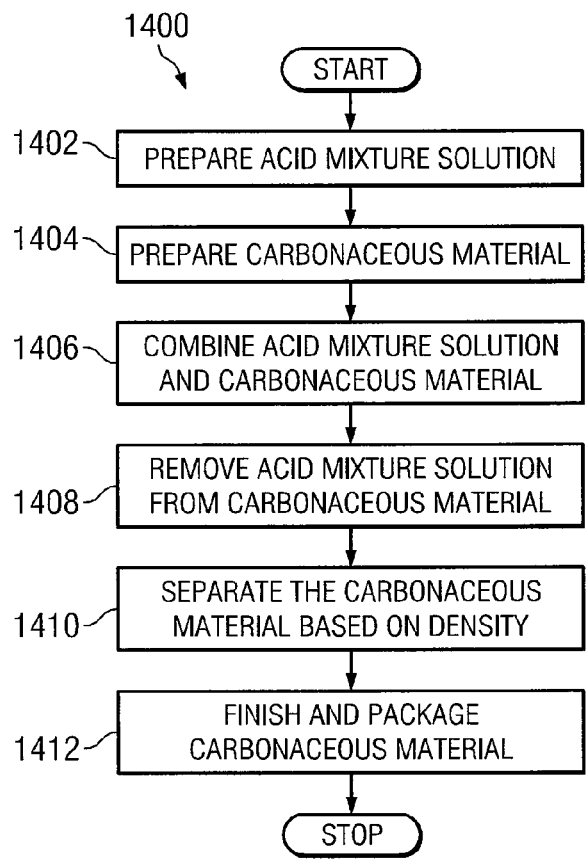
FIG. 14 illustrates a flow diagram for an exemplary process for refining carbonaceous material according to an embodiment of the present invention.

In addition to the aforementioned aspects and embodiments of the present system for refining carbonaceous material, the present invention further includes methods for refining carbonaceous material. FIG. 14 illustrates an embodiment 1400 of a method for refining carbonaceous material. In step 1402, an acid mixture solution is prepared by mixing HF, $H_2O$, and $H_2SiF_6$ to a desired proportion. In this step, stored concentrated HF and $H_2SiF_6$ may be individually pumped to individual vessels where the concentration of each is reduced with water or a base. Then, these reduced concentrations of the HF and $H_2SiF_6$ may be combined into a vessel that then mixes and heats the mixture of HF, $H_2SiF_6$, and $H_2O$. In this step the exact amount of acid mixture solution is prepared for a specific amount of carbonaceous material to be digested.

In step 1404, the carbonaceous material is prepared by sizing a source of carbonaceous material, such as a preparation plant setting pond stream This step further includes wetting the carbonaceous material with $H_2O$ to a desired content, such as from about 8% to about 10% w/w. This step may further include the application of ultrasonic waves to the carbonaceous material during prior to or during the sizing operation.

In step 1406, the carbonaceous material and acid mixture solution are combined in a digestion vessel which is temperature and pressure controlled. This step may further include transferring the carbonaceous material/acid mixture solution to a second digestion vessel for additional digestion time. This step may further include transferring the carbonaceous material/acid mixture solution to a third digestion vessel for addition digestion time. This step may further include the application of ultrasonic waves to the digestion vessel or to a roundabout or circuit pipe that takes a stream of the carbonaceous material/acid mixture solution out of the digestion vessel and then later inputs it back into the digestion vessel after the application of ultrasonic waves for improved digestion.

In step 1408, the carbonaceous material/acid mixture solution is transferred to a centrifuge for removal of the acid mixture solution. This step may further include spraying rinse water into the centrifuge for washing any residual acid mixture solution from the carbonaceous material. This may be followed by additional centrifuging until the carbonaceous material has a desirable moisture content.

In step 1410, the carbonaceous material may be further dried and separated based on densities to achieve the size of desirable product for a particular application or order. This step may include applying an air flow in a vertical vessel such that the less dense carbonaceous material is removed from the top of the dryer while the more dense carbonaceous material is retained in the dryer for removal to a storage vessel, such as a sack. In step 1412, the carbonaceous material is finished and weighed into final storage containers, such as sacks for their intended purpose. The process described herein is scale independent and can be used on a micro-scale, mesa-scale, and macro-scale.

Figure 15:
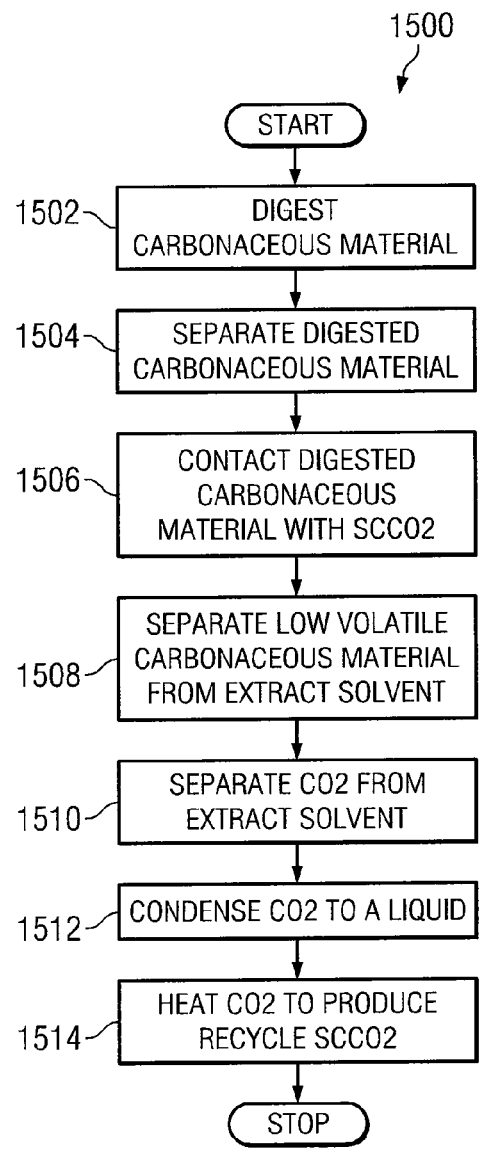
FIG. 15 illustrates a flow diagram for an exemplary process for making low volatile carbonaceous matter.

In another embodiment, the present invention further includes methods for making low volatile carbonaceous material. FIG. 15 illustrates an embodiment 1500 of a method for making low volatile carbonaceous material. In step 1502, a supply of carbonaceous material is digested according to the description and principles described herein. An acid mixture solution is contacted with a supply of sized carbonaceous material to produce a digested carbonaceous material/acid mixture solution. In step 1504, the digested carbonaceous material is separated from the digested carbonaceous material/acid mixture solution. In step 1506, the digested carbonaceous material is contacted with supercritical carbon dioxide fluid to extract hydrocarbons from the digested carbonaceous material to produce an extract solvent and a low volatile carbonaceous material. This step may include supplying the digested carbonaceous material to an extraction vessel 1002.

In step 1508, the low volatile carbonaceous material is separated from the extract solvent by use of an outlet in the extraction vessel 1002, which may feed carbonaceous material storage vessel 1014. In step 1510, a stream of carbon dioxide gas is separated from the extract solvent. This step may include feeding the extract solvent to one or more separators 1006, 1008, 1010, and 1012 that are pressure and temperature controlled to increase the ratio of vapor pressure of the carbon dioxide gas to soluble hydrocarbons contained in the extract solvent. In step 1512, the carbon dioxide gas is condensed to a liquid by means of a condenser, such as condenser 1026. In step 1514, the carbon dioxide liquid is heated to produce a recycle stream of supercritical carbon dioxide fluid for re-use in the extraction vessel 1002.

Figure 16:
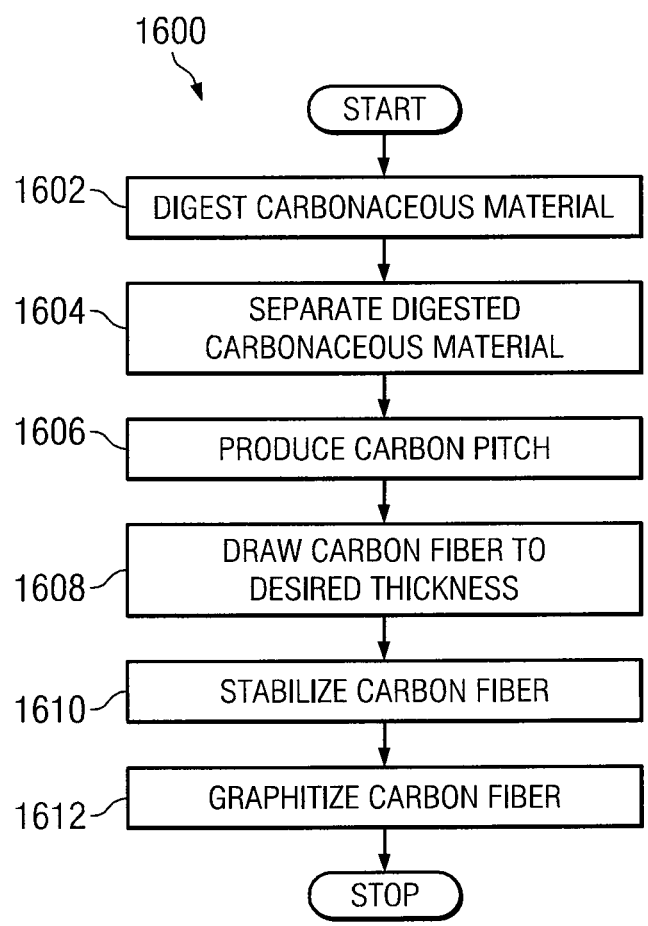
FIG. 16 illustrates a flow diagram for an exemplary process for making carbon fiber.

FIG. 16 illustrates an embodiment 1600 of a method for making carbon fiber. In step 1602, a supply of carbonaceous material is digested according to the description and principles described herein. In step 1604, the digested carbonaceous material is separated from the digested carbonaceous material/acid mixture solution as described herein. In step 1606, a carbon pitch is produced from the digested carbonaceous material in accordance with the description and principles described herein. In step 1608, ungraphitized carbon fiber is drawn from the carbon pitch to a desired diameter in accordance with principles commonly known to those skilled in the art. In step 1610, the ungraphitized carbon fiber is stabilized in a stabilizing unit 1204 to produce a stabilized carbon fiber. In step 1612, the stabilized carbon fiber is graphitized in a carbonizing unit 1206, graphitizing unit 1208, or both, to make the carbon fiber.

There has been described a system for making low volatile carbonaceous matter. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, different temperatures, pressures, acid mixture solution compositions, solvent compositions, and the like may be changed or altered to fit within the present system for making low volatile carbonaceous matter described herein or other without departing from the inventive concepts.

What is claimed:

1. A system for making low volatile carbonaceous material comprising:
    a digestion vessel in communication with a carbonaceous material feedstock unit for producing a digested carbonaceous material, wherein the digestion vessel comprises a first vibratory screen unit, a density differential separation apparatus in communication with said first vibratory screen unit, an input for a carbonaceous material feedstock, an input for an acid mixture solution, the acid mixture solution including HF and $H_2SiF_6$, the acid mixture solution in the digestion vessel, and an output for the digested carbonaceous material, and wherein during operation the digestion vessel contains an acid mixture solution from an acid vessel and carbonaceous material feedstock for digesting the carbonaceous material feedstock;
    an extraction vessel in communication with said digestion vessel, said extraction vessel containing supercritical carbon dioxide fluid for extracting hydrocarbons from said digested carbonaceous material to produce an extract solvent and said low volatile carbonaceous material, wherein the extraction vessel comprises an input for the digested carbonaceous material, an input for supercritical carbon dioxide fluid, an output for the extract solvent, and an output for the low volatile carbonaceous material, and wherein during operation the extraction vessel contains the digested carbonaceous material from the digestion vessel and the supercritical carbon dioxide from a supercritical carbon dioxide vessel for contacting the digested carbonaceous material and the supercritical carbon dioxide;
    at least one separation vessel in communication with said extraction vessel for separating said extract solvent to a carbon dioxide gas and a stream of extracted hydrocarbons, wherein the at least one separation vessel comprises an input for the extract solvent, an output for carbon dioxide gas, and an output for the stream of extracted hydrocarbons, and wherein during operation the at least one separation vessel contains the extract solvent for converting the extract solvent into carbon dioxide gas and the stream of extracted hydrocarbons; and
    a moisture balancing unit including a source of water and steam that increases the moisture content of the carbonaceous material feedstock.

2. The system for making low volatile carbonaceous material of claim 1 further comprising:
    a condenser in communication with said at least one separation vessel for condensing said stream of carbon dioxide gas to a carbon dioxide liquid.

3. The system for making low volatile carbonaceous material of claim 1 wherein said at least one separator is operated at a temperature and pressure to produce said carbon dioxide gas from said extract solvent.

4. The system for making low volatile carbonaceous material of claim 1 wherein said an extraction vessel is operated from about 73 atm to about 300 atm.

5. The system for making low volatile carbonaceous material of claim 1 wherein said an extraction vessel is operated from about 32° C. to about 300° C.

6. The system for making low volatile carbonaceous material of claim 1 wherein said supercritical carbon dioxide fluid further comprises:
    a secondary solvent selected from the group consisting of ethane, propane, trifluoro-chloromethane, difluoro-dichloromethane, trifluoro-bromoethane, methyl fluoride, ethylene, propylene, isobutene, n-pentane, isopentane, tetramethylmethane, n-heptane, and isoheptane.

7. A system for making activated carbon from a devolatilized carbonaceous material comprising:
    a digestion vessel in communication with a carbonaceous material feedstock unit for producing a digested carbonaceous material, wherein the digestion vessel comprises a first vibratory screen unit, a density differential separation apparatus in communication with said first vibratory screen unit, an input for a carbonaceous material feedstock, an input for an acid mixture solution and an output for the digested carbonaceous material, and wherein during operation the digestion vessel contains an acid mixture solution from an acid vessel and carbonaceous material feedstock for digesting the carbonaceous material feedstock;

an extraction vessel in communication with said digestion vessel, said extraction vessel containing a solvent for extracting hydrocarbons from said digested carbonaceous material to produce an extract solvent and said activated carbon, wherein the extraction vessel comprises an input for the digested carbonaceous material, an input for supercritical carbon dioxide fluid, an output for the extract solvent, and an output for the low volatile carbonaceous material, and wherein during operation the extraction vessel contains the digested carbonaceous material from the digestion vessel and the supercritical carbon dioxide from a supercritical carbon dioxide vessel for contacting the digested carbonaceous material and the supercritical carbon dioxide;

at least one separation vessel in communication with said extraction vessel for separating said extract solvent into a stream of activated carbon and a stream of extract mixture, wherein the at least one separation vessel comprises an input for the extract solvent, an output for carbon dioxide gas, and an output for the stream of extracted hydrocarbons, and wherein during operation the at least one separation vessel contains the extract solvent for converting the extract solvent into carbon dioxide gas and the stream of extracted hydrocarbons; and a moisture balancing unit including a source of water and steam that increases the moisture content of the carbonaceous material feedstock.

8. The system for making activated carbon from a devolatilized carbonaceous material of claim 7 wherein said solvent is selected from N-Methyl-2-Pyrrolidone, dimethylformamide, dimethylacetamide, a dipolar aprotic solvent, and dimethyl sulfoxide.

9. The system for making activated carbon from a devolatilized carbonaceous material of claim 7 further comprising:
a dryer unit in communication with said at least one separation vessel for vaporizing said solvent contained in said extract mixture for producing a substantially solvent-free hydrocarbon stream.

10. The system for making activated carbon from a devolatilized carbonaceous material of claim 7 wherein a ratio of digested carbonaceous material to solvent is present from about 1:10 to about 1:1.

11. A system for making low volatile carbonaceous material comprising:
means for digesting contaminants in a carbonaceous material with an acid mixture solution, the acid mixture solution including HF and $H_2SiF_6$, to produce a digested carbonaceous material/acid mixture solution, wherein the means for digesting contaminants further comprises means for sizing said carbonaceous material, means for inputting a carbonaceous material feedstock, means for inputting an acid mixture solution, means for separating the carbonaceous material/acid mixture solution in communication with said means for sizing, and means for outputting the digested carbonaceous material, and wherein during operation the means for digesting contaminants contains an acid mixture solution from a means for storing acid and carbonaceous material feedstock for digesting the carbonaceous material feedstock;

first means for separating said digested carbonaceous material from said digested carbonaceous material/acid mixture solution;

means for contacting said digested carbonaceous material with a supercritical carbon dioxide fluid for extracting hydrocarbons from said digested carbonaceous material to produce an extract solvent and a low volatile carbonaceous material, wherein the means for contacting further comprises means for inputting the digested carbonaceous material, means for inputting supercritical carbon dioxide fluid, means for outputting the extract solvent, and an output for the low volatile carbonaceous material, and wherein during operation the means for contacting contains the digested carbonaceous material from the means for digesting and the supercritical carbon dioxide from a means for storing supercritical carbon dioxide for contacting the digested carbonaceous material and the supercritical carbon dioxide;

second means for separating said low volatile carbonaceous material from said extract solvent, wherein the second means for separating said low volatile carbonaceous material from said extract solvent further comprises means for inputting the extract solvent, means for outputting carbon dioxide gas, and second means for outputting the stream of extracted hydrocarbons, and wherein during operation the means for separating contains the extract solvent for converting the extract solvent into carbon dioxide gas and the stream of extracted hydrocarbons; and a moisture balancing unit including a source of water and steam that increases the moisture content of the carbonaceous material feedstock.

12. The system for making low volatile carbonaceous material of claim 11 further comprising:
third means for separating carbon dioxide gas from said extract solvent.

13. The system for making low volatile carbonaceous material of claim 12 further comprising:
means for condensing said carbon dioxide gas to a carbon dioxide liquid.

14. The system for making low volatile carbonaceous material of claim 13 further comprising:
means for heating said carbon dioxide liquid to produce a recycle stream of supercritical carbon dioxide fluid.

15. The system of claim 7 wherein the acid mixture solution includes HF and $H_2SiF_6$.

16. The system of claim 15 wherein the acid mixture solution is in the digestion vessel.

17. The system of claim 11 wherein the acid mixture solution is in the means for digesting contaminants in a carbonaceous material.

18. The system of claim 1, further comprising: a condenser, the at least one separation vessel in communication with the condenser, and the at least one separation vessel located between the condenser and the extraction vessel, and the at least one separation vessel including multiple separators for providing different density cuts of hydrocarbons.

* * * * *